(12) United States Patent
Marin et al.

(10) Patent No.: US 7,191,587 B2
(45) Date of Patent: Mar. 20, 2007

(54) HYBRID OXYGEN-FIRED POWER GENERATION SYSTEM

(75) Inventors: Ovidiu Marin, St. Cloud (FR); Scott Macadam, Laramie, WY (US)

(73) Assignee: American Air Liquide, Inc., Fremont, CA (US)

( * ) Notice: Subject to any disclaimer, the term of this patent is extended or adjusted under 35 U.S.C. 154(b) by 143 days.

(21) Appl. No.: 10/698,842

(22) Filed: Oct. 31, 2003

(65) Prior Publication Data

US 2004/0134197 A1 Jul. 15, 2004

Related U.S. Application Data

(60) Provisional application No. 60/425,817, filed on Nov. 13, 2002.

(51) Int. Cl.
*F02C 3/30* (2006.01)
*F02C 3/34* (2006.01)

(52) U.S. Cl. .................... 60/39.17; 60/39.52; 60/39.55

(58) Field of Classification Search ............... 60/39.17, 60/39.511, 39.52, 39.55, 774, 775
See application file for complete search history.

(56) References Cited

U.S. PATENT DOCUMENTS

| | | |
|---|---|---|
| 3,736,745 A | 6/1973 | Karig |
| 4,434,613 A | 3/1984 | Stahl |
| 4,498,289 A | 2/1985 | Osgerby |
| 4,729,217 A | 3/1988 | Kehlhofer |
| 5,175,995 A | 1/1993 | Pak et al. |
| 5,247,791 A | 9/1993 | Pak et al. |
| 5,265,410 A | 11/1993 | Hisatome |
| 5,715,673 A | 2/1998 | Beichel |
| 5,802,840 A | 9/1998 | Wolf |
| 5,956,937 A | 9/1999 | Beichel |
| 6,269,624 B1 | 8/2001 | Frutschi et al. |

(Continued)

FOREIGN PATENT DOCUMENTS

| | | |
|---|---|---|
| CA | 2 081 189 | 4/1994 |
| DE | 43 03174 | 8/1994 |
| EP | 0 367 428 | 5/1990 |
| EP | 0 717 180 | 6/1996 |
| EP | 0 773 416 | 5/1997 |

OTHER PUBLICATIONS

O. Bolland and S. Saether in Energy Conversion & Management, vol. 33, Nov. 5-8, 1992, p. 467.

(Continued)

*Primary Examiner*—L. J. Casaregola
(74) *Attorney, Agent, or Firm*—Christopher J. Cronin (57) ABSTRACT

An oxygen fired power generation system is disclosed. The power generation system has a high pressure combustor having a water recycle temperature control subassembly, and an intermediate pressure combustor having a $CO_2$ recycle temperature control subassembly. Thus, a first energy cycle utilizes a first energy source operatively associated with a corresponding first heat sink, and a first inert agent to provide energy transfer therebetween and temperature control during operation of the first energy source. In like fashion, a second energy cycle utilizes a second energy source operatively associated with a corresponding second heat sink, and a second inert agent to provide energy transfer therebetween and temperature control during operation of the second energy source. The first and second energy sources are not identical, the first and second heat sinks are not identical and the first and second inert agents are not identical. The first and second energy cycles are configured in combination to provide a power generation unit.

1 Claim, 10 Drawing Sheets

U.S. PATENT DOCUMENTS 6,282,901 B1    9/2001   Marin et al.
6,314,896 B1   11/2001   Marin et al.
6,637,183 B2 * 10/2003   Viteri et al. ............... 60/39.52
6,957,539 B2 * 10/2005   Lebas et al. ............... 60/39.52

OTHER PUBLICATIONS

E.I. Yantovskii in Proceedings of World Clean Energy Conference, Geneva, Switzerland, 1991, pp. 571-595.

Proceedings of Third International Conference on Carbon Dioxide Removal (ICCDR-3), Boston, 1996.

ASME paper 95-CTP-79, ASME Cogen-Turbo Power Conference, Vienna, Austria (1995).

CIMAC paper G07, CIMAC Conference, Interlaken, Switzerland (1995).

International Search Report.

\* cited by examiner

| | | | |
|---|---|---|---|
| Fuel | CH4 | HP combustor | |
| Temperature inlet | 293 K | Pressure outlet | 103.4 bar |
| Pressure inlet | 12.41 bar | Pressure drop | 10% |
| | | reaction | complete |
| Oxidant | O2 | Q loss | 0 = adiabatic |
| Temperature inlet | 293 K | | |
| Pressure inlet | 27.58 bar | Turb1 = Steam turbine HP | |
| | | method | isentropic |
| Fuel 2 | CH4 | discharge pressure | 10 bar |
| Temperature inlet | 293 K | efficiency | 0.9 |
| Pressure inlet | 10 bar | Inlet temperature | 1089 K |
| | | | |
| Oxidant | O2 | Reheater IP | |
| Temperature inlet | 293 K | Pressure outlet | 9 bar |
| Pressure inlet | 10 bar | Pressure drop | 10% |
| | | reaction | complete |
| o2 & ch4 (HP) (IP) Mcompressors | | Q loss | 0 = adiabatic |
| number of stage | 4 | Turb2 = Gas turbine IP | |
| method | polytropic | method | isentropic |
| discharge pressure | (114.8) (10) bar | discharge pressure | 0.04 bar |
| efficiency | 0.8 | isentropic efficiency | 0.93 |
| intercooling | 90 F each stg expt last | Inlet temperature | 2200 2600 3000 F |
| Pressure drop | 0 psi | | |

*TABLE 7--Water Recycle*

| Gas turbine side | |
|---|---|
| Fuel | CH4 |
| Temperature inlet | 293 K |
| Pressure inlet | 10 bar |
| | |
| Oxidant | O2 |
| Temperature inlet | 293 K |
| Pressure inlet | 10 bar |
| | |
| IP combustor | |
| Pressure outlet | 9 bar |
| pressure drop | 10% |
| reaction | complete |
| Q loss | 0 W adiabatic |
| | |
| Gas turbine | |
| method | isentropic |
| discharge pressure | 1 bar |
| efficiency | 0.93 |
| Inlet temperature | 2200 2600 3000 |
| | |
| HRSG | |
| hot stream outlet | 140 F |
| Pressure drop | not taken into account |
| | |
| Condensor 1 | |
| hot stream outlet | 100 F |
| Pressure drop | not taken into account |
| | |
| (Co2) Mcompressor | |
| number of stage | 4 |
| method | polytropic |
| discharge pressure | 10 bar |
| efficiency | 0.8 |
| | |
| intercooling | 90 F each stg expt last |
| Pressure drop | not taken into account |
| | |
| Water pump | |
| discharge pressure | 2 bar |
| efficiency | 0.75 |
| | |
| Water | |
| Temperature inlet | 293 K |
| Pressure inlet | 1 bar |

| Steam turbine side | |
|---|---|
| Steam turbine | |
| method | isentropic |
| discharge pressure | 0.04 bar |
| efficiency | 0.9 |
| Inlet temperature | 1089 K |
| | |
| Condensor 2 | |
| hot stream outlet | vap frac = 0 |
| Pressure drop | not taken into account |
| | |
| Separator 1 | |
| temperature | 305 K |
| pressure | 1 bar |
| Liquid entrainment | 0 |
| | |
| Water pump | |
| discharge pressure | 2 bar |
| efficiency | 0.75 |
| | |
| Water | |
| Temperature inlet | 293 K |
| Pressure inlet | 1 bar |
| | |
| Circulation pump | |
| discharge pressure | 100 bar |
| efficiency | 0.75 |

*TABLE 8--$CO_2$ Recycle*

| Fuel | CH4 |
|---|---|
| Temperature inlet | 293 K |
| Pressure inlet | 12.41 bar |
| | |
| Oxidant | O2 |
| Temperature inlet | 293 K |
| Pressure inlet | 27.58 bar |
| | |
| Fuel 2 | CH4 |
| Temperature inlet | 293 K |
| Pressure inlet | 10 bar |
| | |
| Oxidant | O2 |
| Temperature inlet | 293 K |
| Pressure inlet | 10 bar |
| | |
| o2 & ch4 (HP) (IP) Mcompressors | |
| number of stage | 4 |
| method | polytropic |
| discharge pressure | (114.8) (10) bar |
| efficiency | 0.8 |
| intercooling | 90 F each stg expt last |
| Pressure drop | 0 psi |
| | |
| (Co2) Mcompressor | |
| number of stage | 3 |
| method | polytropic |
| discharge pressure | 10 bar |
| isentropic efficiency | 0.8 |
| intercooling | 90 F each stg expt last |
| Pressure drop | 0 psi |

| HP combustor | |
|---|---|
| Pressure outlet | 103.4 bar |
| Pressure drop | 10% |
| reaction | complete |
| Q loss | 0=adiabatic |
| | |
| Turb1 = Steam turbine HP | |
| method | isentropic |
| discharge pressure | 10 bar |
| efficiency | 0.9 |
| Inlet temperature | 1089 K |
| | |
| Reheater IP | |
| Pressure outlet | 9 bar |
| Pressure drop | 10% |
| reaction | complete |
| Q loss | 0=adiabatic |
| | |
| Turb2 = Gas turbine IP | |
| method | isentropic |
| discharge pressure | 0.04 bar |
| isentropic efficiency | 0.93 |
| Inlet temperature | 2200 2600 3000 F |

| Vacuum 'pump' (Mcompressor) | |
|---|---|
| number of stage | 4 |
| method | polytropic |
| discharge pressure | 10 bar |
| isentropic efficiency | 0.8 |
| intercooling | 90 F each stage |
| Pressure drop | 0 psi |
| | |
| HeatX 1 = Condensor | |
| hot stream outlet | 333 K |
| Pressure drop | not taken into account |
| | |
| HeatX B1 = recuperator | |
| hot stream outlet | 605 K |
| Pressure drop | not taken into account |
| | |
| Air cooler | |
| hot stream outlet | 295 K |
| Pressure | 0.04 bar |
| Pressure drop | not taken into account |
| | |
| co2 reheater | |
| hot stream outlet | 326.6 K |
| Pressure drop | not taken into account |
| | |
| Water pump | pump |
| discharge pressure | 114.8 bar |
| efficiency | 0.75 |
| | |
| Wout pump | pump |
| discharge pressure | 1 bar |
| efficiency | 0.75 |
| | |
| Water | |
| Temperature inlet | 293 K |
| Pressure inlet | 1 bar |

*TABLE 9 — Preferred Embodiment*

| Type of cycle | T HP | T IP | Final Pressure | M.F. CO2 | M.F. CO2 | Eff | Eff |
|---|---|---|---|---|---|---|---|
| | F | F | Bar | flue gas | recycled | without seq | with seq |
| matiant | 1500 | 2200 | 1 & 0.04 | 0.930 | 0.916 | 0.456 | 0.438 |
| matiant | 1500 | 2600 | 1 & 0.04 | 0.914 | 0.893 | 0.471 | 0.452 |
| matiant | 1500 | 3000 | 1 & 0.04 | 0.868 | 0.897 | 0.487 | 0.468 |
| | | | | | | | |
| CES | 1500 | 2200 | 0.04 | 0.222 | 0.000 | 0.516 | 0.498 |
| CES | 1500 | 2600 | 0.04 | 0.234 | 0.000 | 0.556 | 0.537 |
| CES | 1500 | 3000 | 0.04 | 0.246 | 0.000 | 0.588 | 0.570 |
| | | | | | | | |
| CO2 case2 | 1500 | 2200 | 0.04 | 0.805 | 0.890 | 0.527 | 509 |
| CO2 case2 | 1500 | 2600 | 0.04 | 0.800 | 0.876 | 0.579 | 0.560 |
| CO2 case2 | 1500 | 3000 | 0.04 | 0.785 | 0.856 | 0.618 | 0.599 |

TABLE 10--Comparison

HYBRID OXYGEN-FIRED POWER GENERATION SYSTEM

CROSS REFERENCE TO RELATED APPLICATION

This application claims the benefit of U.S. Provisional Application No. 60/425,817, filed 13 Nov. 2002.

BACKGROUND OF THE INVENTION

1. Field of the Invention

The present invention relates to the field of power generation systems. More particularly, the present invention is directed to a novel oxygen-fired power generation system offering a combination of temperature controls and power generation mechanisms to achieve a higher power generation efficiency than that provided by the prior art. Specifically, an oxygen fired power generation system is provided having a high pressure combustor having a water recycle temperature control subassembly, and an intermediate pressure combustor having a $CO_2$ recycle temperature control subassembly. Thus, a first energy cycle utilizes a first energy source operatively associated with a corresponding first heat sink, and a first inert agent to provide energy transfer therebetween and temperature control during operation of the first energy source. In like fashion, a second energy cycle utilizes a second energy source operatively associated with a corresponding second heat sink, and a second inert agent to provide energy transfer therebetween and temperature control during operation of the second energy source. The first and second energy sources are not identical, the first and second heat sinks are not identical and the first and second inert agents are not identical.

The first and second energy cycles are configured in combination to provide a power generation unit.

2. Description of the Prior Art

Oxygen-fired, zero-emission power generation schemes have been proposed in the past. For example, the schemes proposed by Beichel, et al. (U.S. Pat. Nos. 5,715,673 and 5,956,937) are based on a process in which a high-pressure combustor is fired with oxygen, gaseous fuel, and water to produce a drive gas for a steam turbine. The discharge from this turbine may be reheated in an intermediate pressure combustor fired with additional fuel and oxygen. The discharge from this combustor then enters a gas turbine to generate additional power. The discharge enters a condenser to separate water, and the carbon dioxide-rich effluent is either vented or compressed, treated, and sold or delivered to a sequestration site.

A method for operating a boiler using oxygen-enriched oxidants is disclosed in U.S. Pat. No. 6,314,896, issued to Marin on 13 Nov. 2001. This invention generally discloses a method for operating a boiler in which oxygen-enriched air is introduced with a fuel into the combustion space within a steam-generating boiler.

Another scheme that has been proposed for the generation of power using steam and gas turbines was proposed by O. Bolland and S. Saether in ENERGY CONVERSION & MANAGEMENT, Vol. 33, Nov. 5–8, 1992, p. 467. The Bolland/Saether scheme consists of supplying a combustor with oxygen from an air separating unit ("ASU"), reacting the oxygen with a fuel, adding water or steam to control the combustor outlet temperature, and passing the combustor gases through a turbine to generate power. In this heat recovery system, a water inlet stream is used to cool the discharge of the ASU main compressor.

Another scheme that has been proposed, by E. I. Yantovskii in PROCEEDINGS OF WORLD CLEAN ENERGY CONFERENCE, Geneva, Switzerland, 1991, pp. 571–595, discloses using oxygen-fired combustion in conjunction with a water recycle. A high-pressure combustor receives oxygen from an ASU, hydrocarbon fuel, and recycled water and produces a steam/$CO_2$ drive gas that enters a turbine. This is followed by two stages of reheating and expansion. The $CO_2$ is separated in a condenser, and the condensate is recycled to the high-pressure combustor. The cycles described are purportedly capable of attaining relatively higher efficiencies, but this is contingent upon the development of advanced steam turbines.

In a process known as the "Matiant" cycle, PROCEEDINGS OF THIRD INTERNATIONAL CONFERENCE ON CARBON DIOXIDE REMOVAL (ICCDR-3), Boston, 1996, a drive gas for a gas turbine is produced by combusting with oxygen and recycled $CO_2$. The drive gas enters a turbine operating at pressures and temperatures characteristic of gas turbines. The turbine discharge enters a heat recovery device such as a heat recovery steam generator, is cooled, and water is separated. A portion of the $CO_2$-rich effluent is recycled to the combustor and the remainder is vented or compressed. Variations of this concept also incorporate techniques to liquify, heat, and expand the $CO_2$ product, as disclosed, for example, in U.S. Pat. No. 5,802,840. Similar schemes are described in U.S. Pat. Nos. 3,736,745, 4,434,613, 4,498,289, 5,175,995, 5,247,791 and 5,265,410.

Although these cycles purport to enable higher efficiency energy production, they are dependent on the development of increasingly high pressure, high temperature turbines which are not currently available.

In contrast to the Matiant cycle, the "Graz Cycle" is described in the literature at ASME paper 95-CTP-79, ASME COGEN-TURBO POWER CONFERENCE, Vienna, Austria (1995), and also in CIMAC paper G07, CIMAC CONFERENCE, Interlaken, Switzerland (1995). In this cycle, a high-pressure combustor is fired with fuel, oxygen, steam, and recycled $CO_2$/steam. The stream leaving the combustor is expanded in a high-pressure turbine and enters a heat recovery system to generate pure steam, which subsequently enters a steam turbine. The discharge from the steam turbine then enters the combustor. After the heat recovery unit, a portion of the high pressure turbine discharge is compressed and recycled back to the combustor. The remaining portion enters a low pressure turbine and a water removal system.

In contrast to the foregoing proposals and power generation systems, the present invention provides an oxygen fired power generation system having a high pressure combustor having a water recycle temperature control subassembly and an intermediate pressure combustor having a $CO_2$ recycle temperature control subassembly.

A problem associated with power generation systems that precede the present invention is that utilize a single inert agent as a temperature control agent, thereby limiting the cycle flexibility.

Another problem associated with power generation systems that precede the present invention is that they utilize a gaseous inert agent, such as $CO_2$, at high pressure, thereby necessitating compression of the gaseous inert agent to facilitate its fluid flow from the separator to the combustor.

Still another problem associated with power generation systems that precede the present invention is that they utilize a multi-phase inert agent, such as water, at high temperature, thereby necessitating condensation of the multi-phase inert agent and the concomitant heat loss thereby to facilitate its fluid flow from the separator to the combustor.

In contrast to the foregoing, the present invention provides a power generation system that seeks to overcome the foregoing problems and provide an optimized power generation system that reduces the fuel consumption, and the required investment, due to the variety of parts compressors, condensers, etc.) that can be adapted for use with the power generation cycle disclosed herein.

SUMMARY OF THE INVENTION

The products of air separation units can be used in various power generation schemes. They can enhance the performance of existing power generation systems, and are expected to play key roles in the high-efficiency, low/zero-emission power generation schemes of the future. Oxygen and oxygen-enriched air have been demonstrated to enhance combustion, increase production, and reduce emissions. Oxy-combustion also has the inherent advantage of producing a $CO_2$-rich flue gas, which can be more easily processed than flue gas from air-blown processes. With the increasing interest in global climate change, more attention will be focused on technologies that facilitate the capture of $CO_2$. Nitrogen product streams can also offer benefits to a power generation system. For instance, high-pressure nitrogen, available from the high-pressure column of a cryogenic ASU, when appropriately heated and expanded in an integrated power generation scheme, can further increase power output.

This invention proposes a novel, oxygen-fired power generation process. It is capable of attaining high efficiencies with zero-emissions, using a variety of fuels, while utilizing existing or near-term technology. Specifically, the invention provides an oxygen fired power generation system having a high pressure combustor having a water recycle temperature control subassembly, and an intermediate pressure combustor having a $CO_2$ recycle temperature control subassembly.

Thus, it is an object of the present invention to provide a power generation system that effectively provides adiabatic temperature control thereof.

Another object of the present invention is to provide a power generation system that maintains the operating temperature of the turbine within an optimal range to facilitate long life of the operating parts and simultaneously maximize the thermal efficiency of the operation.

Still a further object of the present invention is to provide a power generation system that prevents the turbine from running too hot, thereby preventing damage to the components thereof.

Yet another object of the present invention is to provide a power generation system that prevents the turbine from running too cold, thereby permitting increased thermal efficiency of the power generation process.

An even further object of the present invention is to provide a power generation system that does not utilize only a single inert agent as a temperature control agent.

Another object of the present invention is to provide a power generation system that does not utilize a gaseous inert agent, such as $CO_2$, at high pressure, thereby obviating the need for compression of the gaseous inert agent to facilitate its fluid flow from the separator to the combustor.

Still another object of the present invention is to provide a power generation system that does not utilize a multi-phase inert agent, such as water, at high temperature, thereby obviating the need for condensation of the multi-phase inert agent and the concomitant heat loss to facilitate its fluid flow from the separator to the combustor.

Yet a further object of the present invention is to provide a power generation system that does not utilize a multi-phase inert agent, such as water, at high temperature, thereby preventing undue corrosion in a turbine.

These and other objects, advantages and features of the present invention will be apparent from the detailed description that follows.

BRIEF DESCRIPTION OF THE DRAWINGS

In the detailed description that follows, reference will be made to the following figures.

DETAILED DESCRIPTION OF PREFERRED EMBODIMENTS

By way of additional background, oxy-fired combustors utilize an enriched oxygen oxidant to reduce combustion emissions. For example, a method for operating a boiler using oxygen-enriched oxidants is disclosed in U.S. Pat. No. 6,314,896, issued to Marin on 13 Nov. 2001, and the teachings of this patent are hereby expressly incorporated herein by reference. Generally, a method for operating a boiler in which oxygen-enriched air is introduced with a fuel into the combustion space within a steam-generating boiler is disclosed. The fuel and oxygen-enriched air are combusted to generate thermal energy. At least a portion of the flue gases are collected and at least a portion are recirculated through the boiler. In the steam-generating boiler, the oxygen-enriched oxidant is introduced at one or more locations within the radiation zone and the convection zone of the boiler. Additionally, flue gas is collected and recirculated into one or more locations within the radiation zone and/or the convection zone of the boiler. The amount of oxygen enrichment and the total gas flow through the boiler is controlled so as to maintain the heat transfer patterns within the boiler at the originally-design specification for operation by air combustion.

The preferred embodiment provides a novel, hybrid oxygen-fired power generation process 10. As shown schematically in FIG. 1, a gaseous fuel 12, oxygen 14, and water 16 enter a high pressure combustor 18, typically operated at a pressure of at least about 50 bars and at intermediate temperatures. The high pressure combustor 18 produces a high temperature drive gas 20 consisting of predominantly steam 22 and $CO_2$ 24. The oxygen/fuel ratio and temperature of the combustor 18 are chosen to ensure clean combustion with minimal formation of byproducts such as CO, $NO_x$ etc. The products of the high pressure combustor 18 expand through a high pressure steam turbine 26 to generate power. The outlet temperature and pressure of the combustor 18 are chosen to match the desired inlet conditions of the steam turbine 26.

Figure 1:
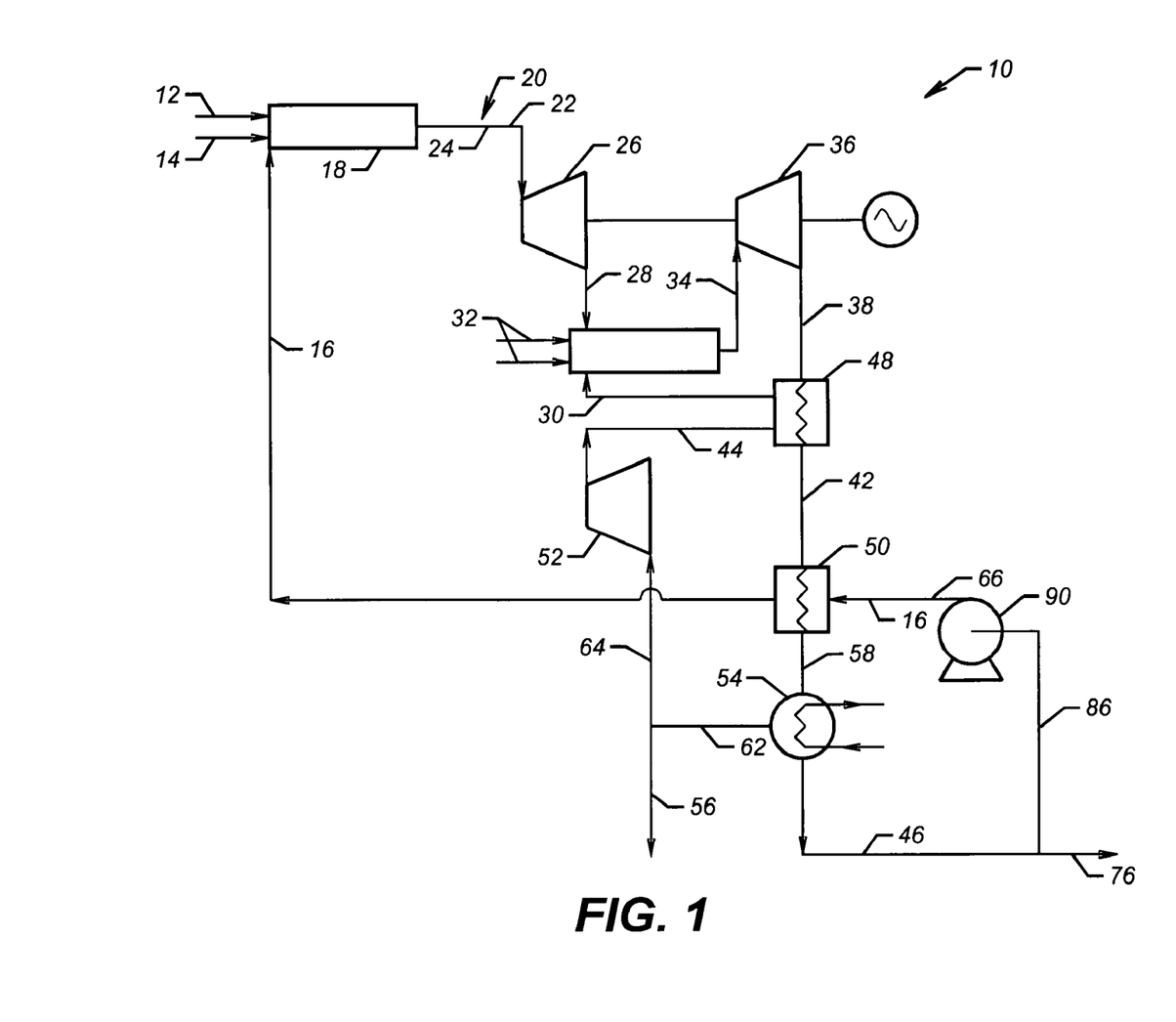
FIG. 1 illustrates a schematic representation of a first preferred embodiment of a power generation system.

Discharge from the high pressure turbine 26 then enters an intermediate pressure combustor 28 along with a recycled gas stream 30 composed of mainly $CO_2$. The intermediate pressure combustor is typically operated at pressures less than about 50 bar, and more particularly operates at conditions similar to those of a gas turbine combustor. This combustor 28 is fired with additional fuel and oxygen 32, to produce a drive gas 34 that expands through a gas turbine 36, generating additional power.

The discharge from the gas turbine enters a heat recovery system. A heat exchanger 48 removes heat from the stream 42 and provides it to the $CO_2$ stream 44 so that the heated $CO_2$ 30 enters the IP combustor 28. Stream 42 is then additionally cooled in the heat recovery system 50, where heat is provided to the water stream 66 which, as heated to become water stream 16, enters the high pressure combustor 18. Stream 58 exiting the heat recovery system 50 is then introduced in the condenser 54, where water is condensed and separated from the $CO_2$ stream 62. This $CO_2$ stream 62 is separated into two sub-streams, stream 64 recycled back to compressor 52, and stream 56, which can be vented or alternately captured for near zero-emission operation. The stream 64 is compressed in the compressor 52 to the intermediate pressure required by the combustor 28. The water stream 46 is also separated into two sub-streams; stream 76 is vented or used for industrial purposes (e.g. as demineralized water) while stream 86 enters pump 90 to exit as stream 66, at the pressure required by the high-pressure combustor 18. Note that stream 66 is heated in the heat recovery system 50.

A feature of this embodiment is that the water content of the drive gas entering the gas turbine may be controlled by manipulating the flowrates of the streams entering the HP and IP combustors. In other words, directing more material to the IP combustor will increase the $CO_2/H_2O$ ratio of the gas turbine inlet stream. Some gas turbines may face design limitations when the moisture content exceeds a given value, and corrosion can be a problem. Minimizing the $H_2O$ concentration will enable existing or near-term gas turbine technology to be used while at the same time providing a higher efficiency power generation operation. Consequently, the preferred embodiment has a practical, immediate use, without depending on the development of new "$H_2O$ tolerant" gas turbine designs. Moreover, current gas turbine technologies already use steam injection for $NO_x$ control; thus, apparatus following the cycle disclosed herein can be readily built for commercial use. Moreover, varying the respective flowrates of the respective streams can be done to effect a water recycle temperature control of the high pressure combustor and a $CO_2$ recycle temperature control of the intermediate pressure combustor.

Figure 2:
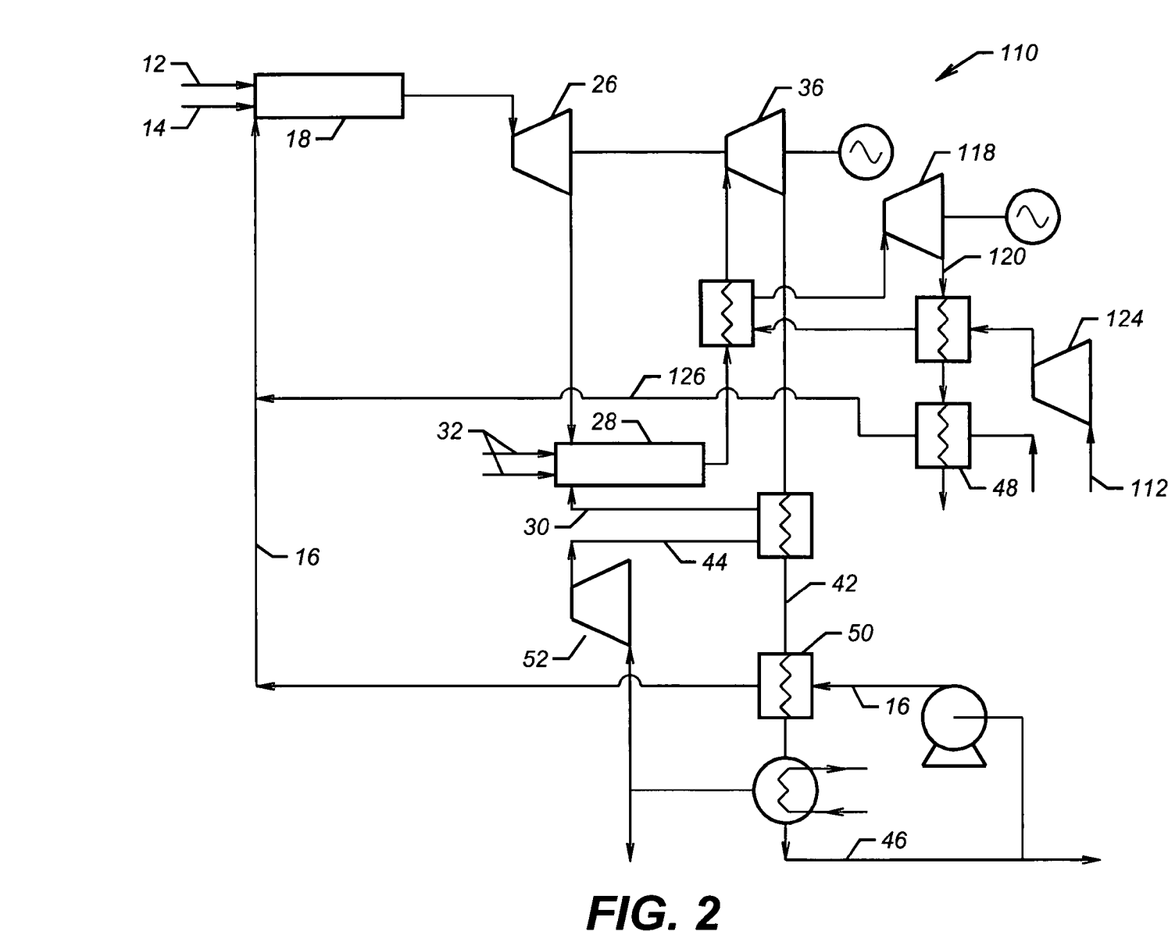
FIG. 2 illustrates a schematic representation of a second preferred embodiment of a power generation system, providing a hybrid oxygen-fired process with nitrogen integration.

Referring now to FIG. 2, a second preferred embodiment 110 uses a high-pressure nitrogen stream 112 produced by the ASU (not shown). In certain ASU designs, nitrogen is available from the high-pressure column at approximately 6 bar. In this embodiment, the HP $N_2$ 112 stream is compressed in a compressor 124 further, heated, and expanded through a turbine 118. The nitrogen discharge 120 is used to preheat the nitrogen stream 112 leaving the compressor 124, and residual heat is recovered by a feed water stream 126.

The cycle has both high pressure (steam turbine) and high temperature (gas turbine) characteristics, which has a positive impact on the overall cycle efficiency. The cycle can be fired with a variety of gaseous fuels such as natural gas, waste fuel gas, and syngas derived from coal, petroleum residues, biomass etc. Since the process produces a $CO_2$-rich effluent amenable to sequestration, the cycle has the potential to be a near zero-emissions process. Finally, acceptable cycle efficiencies may be attained using existing or near-term turbine technology.

Figure 4:
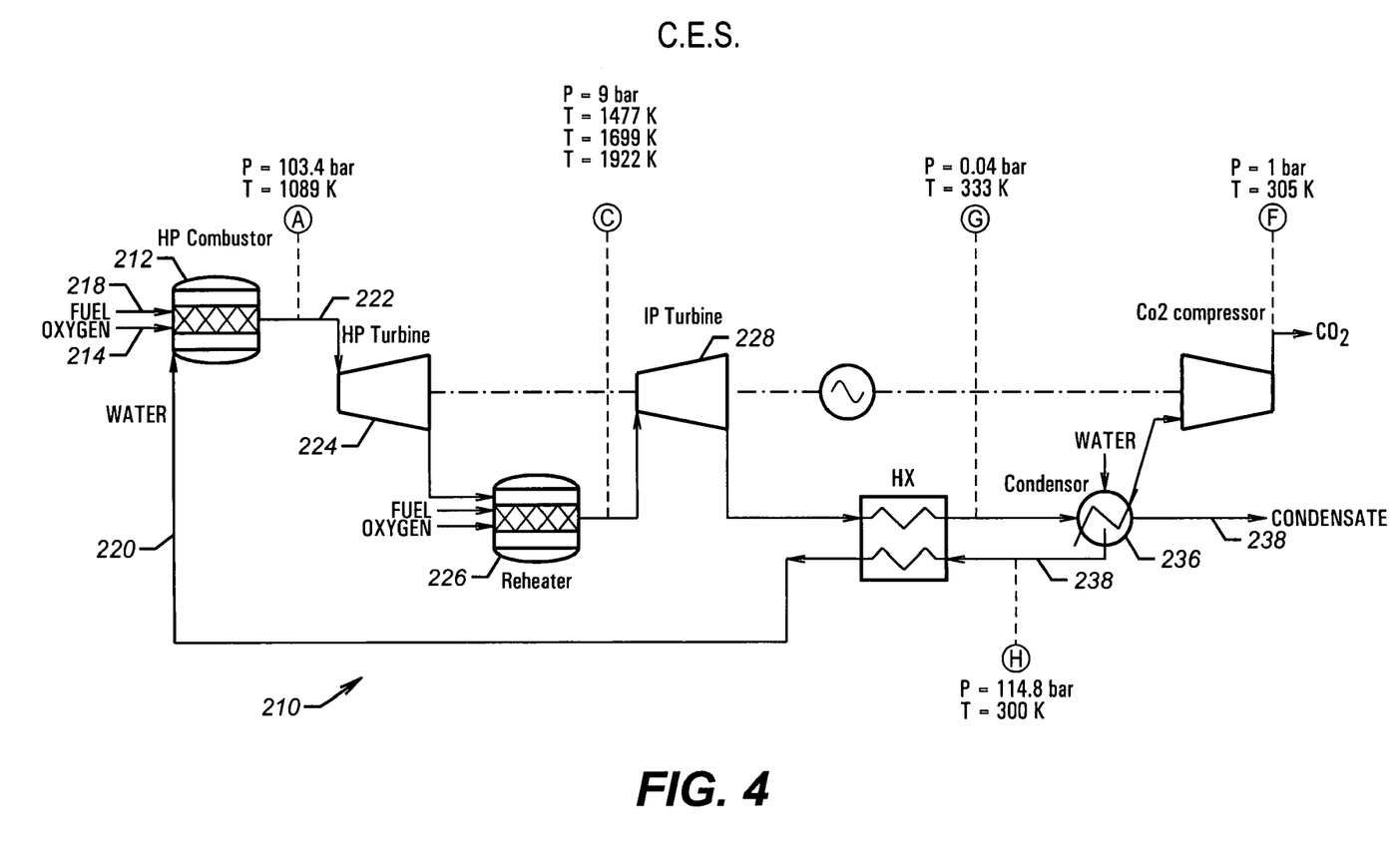
FIG. 4 illustrates a schematic representation of a power generation system according to a water recycling scheme.

Referring now for comparison to FIG. 4, a water recycling scheme 210 is illustrated. A high-pressure combustor 212 receives oxygen 214 from an ASU (not shown), hydrocarbon fuel 218, and recycled water 220 and produces a steam/$CO_2$ drive gas 222 that enters a turbine 224. This is followed by two stages of reheating 226 and expansion 228 (only one is illustrated). The $CO_2$ 234 is separated in a condenser 236, and the condensate 238 is recycled to the high-pressure combustor 212. The cycles described are purportedly capable of attaining relatively higher efficiencies, but this is contingent upon the development of advanced steam turbines that can operate at the requisite conditions.

Figure 5:
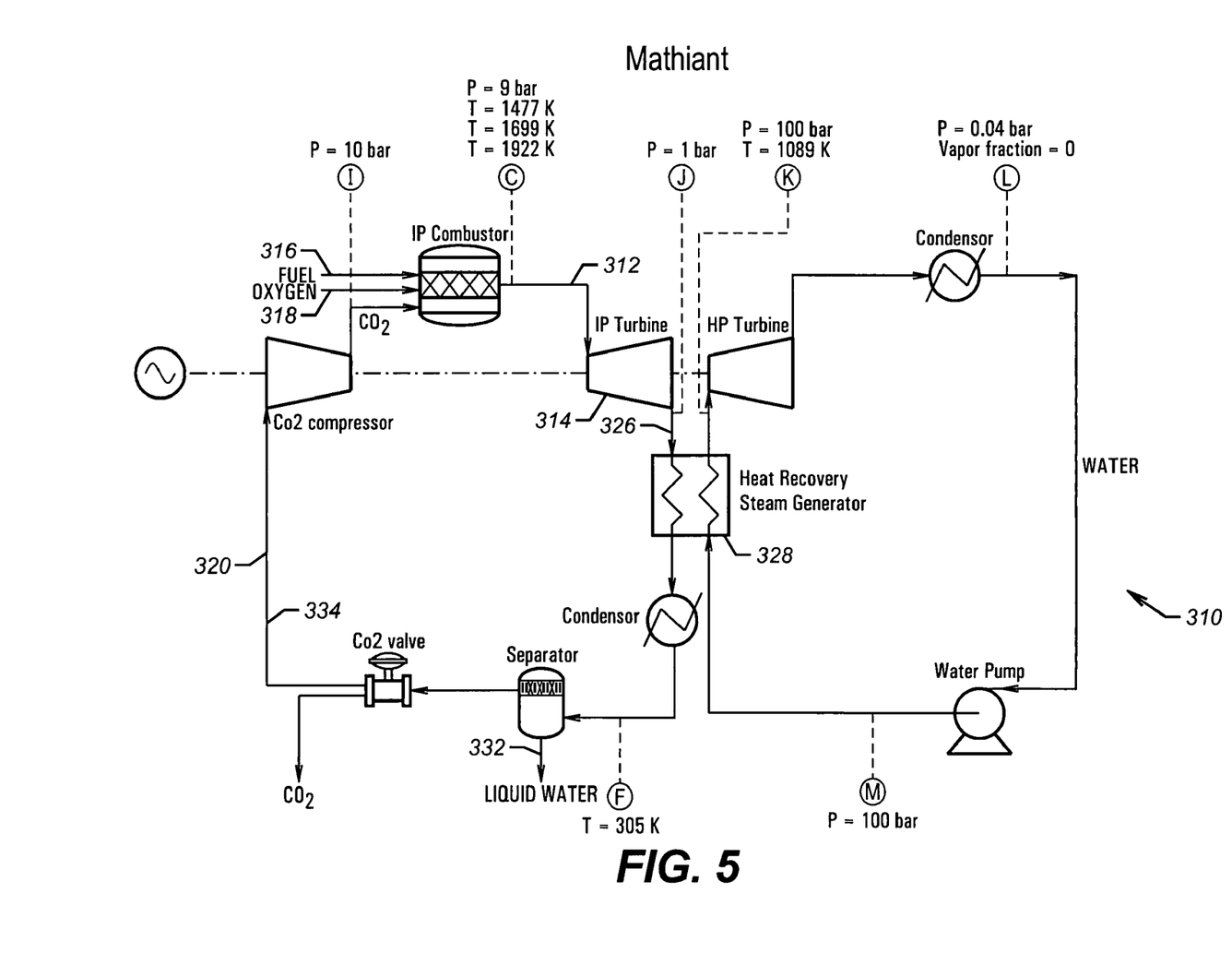
FIG. 5 illustrates a schematic representation of a power generation system according to a $CO_2$ recycling scheme.

Referring now for comparison to FIG. 5, the $CO_2$ recycling scheme 310 is illustrated. A drive gas 312 for a gas turbine 314 is produced by combusting gaseous fuel 316 with oxygen 318 and recycled $CO_2$ 320. The drive gas 312 enters the turbine 314 operating at pressures and temperatures characteristic of gas turbines. The turbine discharge 326 enters a heat recovery device 328 such as a heat recovery steam generator, is cooled, and water 332 is separated. A portion of the $CO_2$-rich effluent 334 is recycled to the combustor and the remainder is vented or compressed.

Figure 3:
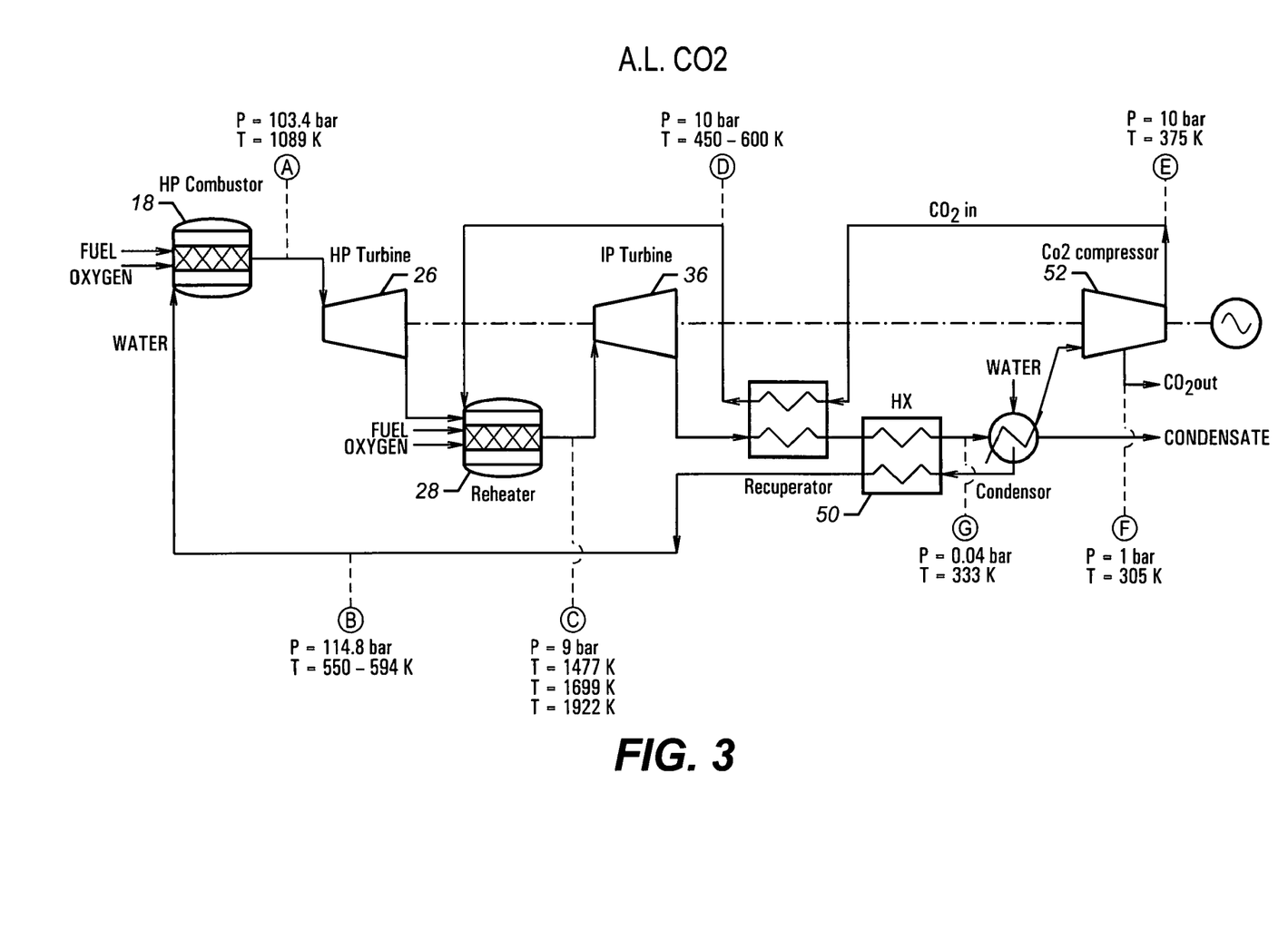
FIG. 3 illustrates an alternative schematic representation of the embodiments disclosed herein.

Note that, in FIGS. 3 through 5, reference letters (contained in circles) illustrate locations in the process where temperature and pressure data was recorded for specific operating conditions during an operation. To more accurately permit a comparison of the efficiencies of the schemes shown, operating conditions were maintained as similarly as practicable. Hence, the same reference letter appears in multiple Figures where the conditions were observed to be identical.

Accordingly, at reference letter A, the temperature was maintained at 1089 K, and the pressure was maintained at 103.4. At reference letter B, the temperature was maintained at 550 to 594 K, and the pressure was maintained at 114.8 bar. At reference letter C, temperatures were recorded at 1477 K, 1699 K and 1922 K, and the pressure was maintained at 9 bar. At reference letter D, the temperature was maintained at 450 K to 600 K, and the pressure was maintained at 10 bar. At reference letter E, the temperature was maintained at 375 K, and the pressure was maintained at 10 bar. At reference letter F, the temperature was maintained at 305 K, and the pressure was maintained at 1 bar. At reference letter G, the temperature was maintained at 333 K, and the pressure was maintained at 0.04 bar. At reference letter H, the temperature was maintained at 300 K, and the pressure was maintained at 114.8 bar. At reference letter I, the pressure was maintained at 10 bar. At reference letter J, the pressure was maintained at 1 bar. At reference letter K, the temperature was maintained at 1089 K, and the pressure was maintained at 100 bar. At reference letter L, the pressure was maintained at 0.04 bar and the vapor fraction was recorded as zero. At reference letter M, the pressure was maintained at 100 bar.

Figure 6:
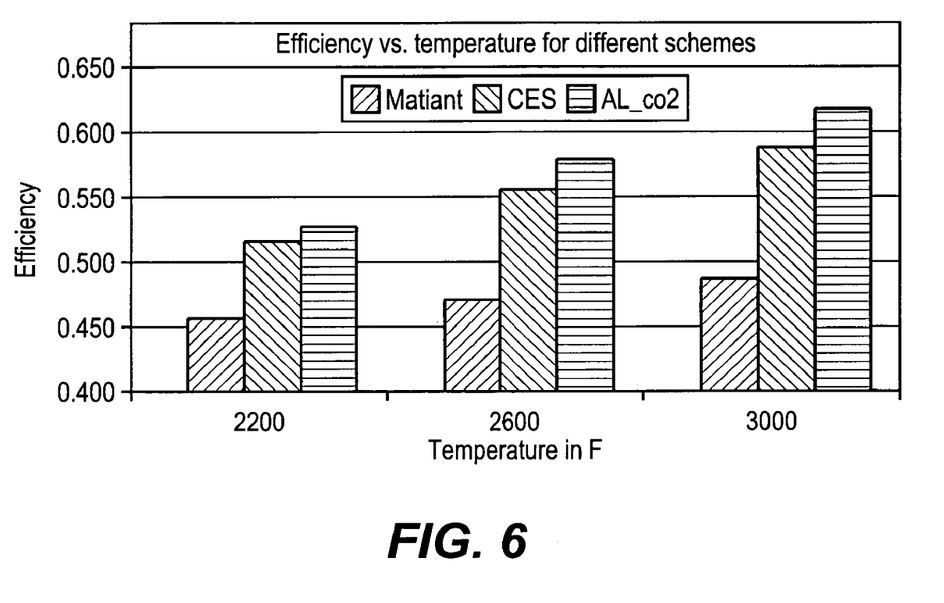
FIG. 6 is a graphical illustration of data comparing the thermal efficiency of the preferred embodiment as compared to a water recycling scheme and a $CO_2$ recycling scheme, respectively, for various operating temperatures of the intermediate pressure combustor; and Tables 7 through 10 illustrate the data from which the thermal efficiencies shown in FIG. 6 were obtained.

As shown in FIG. 6, the thermal efficiencies of the preferred embodiment (FIG. 3), a water recycling scheme (FIG. 4) and a $CO_2$ recycling scheme (FIG. 5) are compared. The data supporting FIG. 6 is reproduced in Tables 7 through 10. The pressures and temperatures at each phase of the respective cycles are disclosed. The values are maintained to be consistent between the schemes to provide objective data regarding the respective thermal efficiencies thereof.

FIG. 6 presents the efficiency values for the three cycles, for different levels of the maximum turbine temperature in the cycle. The results show that the $CO_2$ recycling cycle leads to the lowest efficiency levels, while the preferred embodiment provided the highest efficiency levels. In addition, the preferred embodiment is the only one which facilitates using validated turbine technologies. The efficiency levels can be further enhanced by integration with the ASU, as shown in FIG. 2.

The preferred embodiments disclose thereby an oxygen-fired power generation system comprising a high-pressure (HP) combustor that produces drive gas for a steam turbine and an intermediate pressure (IP) combustor that produces drive gas for a gas turbine. The HP combustor receives gaseous fuel, oxygen, and steam/water to produce a stream consisting of mainly steam, with the balance $CO_2$. The IP combustor receives gaseous fuel, oxygen, the discharge from the HP turbine, and a recycled gas stream consisting of mainly $CO_2$. The discharge from the gas turbine enters a heat recovery system, is cooled, water is removed, and a portion of the $CO_2$ rich stream is compressed and recycled to the IP combustor. The $CO_2/H_2O$ ratio of the gas turbine inlet stream is set by the mass flowrates of the inlet streams, thereby allowing existing or near-term "$H_2O$ tolerant" gas turbines to be used. The cycle efficiency may be further increased by integrating the process with a high-pressure nitrogen stream from the ASU. The cycle can attain high efficiencies with existing or near-term technologies, can be fired with a variety of gaseous fuels, and is a zero-emissions process.

The oxygen fired power generation system of the preferred embodiments has a high pressure combustor having a water recycle temperature control subassembly, and an intermediate pressure combustor having a $CO_2$ recycle temperature control subassembly. The high pressure combustor produces drive gas for a high pressure turbine. The intermediate pressure combustor produces a gas for an intermediate pressure turbine.

A method for generating power is also described. A gaseous fuel, oxygen and water are mixed in a high pressure combustor and burned to produce a high temperature drive gas consisting substantially of steam and $CO_2$ products. The steam and $CO_2$ products are expanded though a high pressure turbine to generate power and a gas-mixture discharge. The discharge is collected from the high pressure turbine and a recycled gas stream comprised substantially of $CO_2$ is collected into an intermediate pressure combustor. The intermediate pressure combustor is fired with additional gaseous fuel and oxygen. A drive gas is produced that expands through a power-generating turbine which generates a gas discharge. The gas discharge is collected from said turbine in a heat recovery system, and cooled to remove discharge water and create a gas stream fraction consisting primarily of $CO_2$. At least a portion of the discharge water is returned to the high pressure combustor. The operating temperature of the high pressure combustor is maintained within a predetermined high pressure combustor operating range. At least a portion of the gas stream fraction is compressed and returned to the intermediate pressure combustor. The operating temperature of the intermediate pressure combustor is maintained within a predetermined intermediate pressure combustor operating range.

The above-described method can be modified to use a heat recovery system having a recuperator and a heat exchanger. The recuperator can heat the compressed gas stream fraction with the gas discharge. The heat exchanger can preheat the water entering the high pressure combustor.

The high pressure combustor operating temperature is maintained between 800 degrees and 2000 degrees Fahrenheit, is even more preferably maintained between 900 degrees and 1500 degrees Fahrenheit, and is most preferably maintained between 1000 degrees and 1200 degrees Fahrenheit. Likewise, the intermediate pressure combustor operating temperature is maintained between 1500 degrees and 3000 degrees Fahrenheit, is more preferably maintained between 1800 degrees and 2600 degrees Fahrenheit, and is most preferably maintained 2000 degrees and 2400 degrees Fahrenheit.

In an alternative embodiment, a method for generating power includes mixing a gaseous fuel, oxygen and water in a high pressure combustor, producing a high temperature drive gas consisting substantially of steam and $CO_2$ products, expanding said steam and $CO_2$ products though a high pressure steam turbine to generate steam power and a steam discharge, collecting said steam discharge from said steam turbine and collecting a recycled gas stream comprised substantially of $CO_2$ into an intermediate pressure combustor. The method further includes firing the intermediate pressure combustor with additional gaseous fuel and oxygen, producing a drive gas that passes through a heat exchanger wherein said heat exchanger heats a compressed nitrogen stream from an air separation unit and cools said drive gas, expanding said cooled drive gas through a gas turbine which generates gas power and a gas discharge containing discharge water, and collecting said gas discharge from said gas turbine in a heat recovery system. The method also includes cooling said gas discharge to remove said discharge water and creating a gas stream fraction, compressing said gas stream fraction, returning at least a portion of said discharge water to the high pressure combustor and compressing said gas stream fraction, returning at least a portion of said compressed gas stream fraction to said intermediate pressure combustor. The operating temperature of the high pressure combustor is maintained within a predetermined high pressure combustor operating range, as described above, and the operating temperature of the intermediate pressure combustor is maintained within a predetermined intermediate pressure combustor operating range, also as described above.

The method can be further modified to include using an air separation unit, by passing a high pressure nitrogen stream through a nitrogen compressor, passing said compressed nitrogen gas stream through a heating system, expanding said heated compressed nitrogen gas stream through a nitrogen turbine which generates nitrogen power and nitrogen gas discharge, collecting said nitrogen gas discharge from said nitrogen turbine in a heat recovery system, recovering residual heat from said nitrogen gas discharge using a feed water stream which creates a nitrogen gas stream fraction and returning said feed water stream to said high pressure combustor.

According to the preferred embodiments, a power generation system has a high pressure combustor having a water recycle temperature control subassembly, and an intermediate pressure combustor having a $CO_2$ recycle temperature control subassembly. More broadly stated, a first energy cycle utilizes a first energy source operatively associated with a corresponding first heat sink, and a first inert agent to provide energy transfer therebetween and temperature control during operation of the first energy source. In like fashion, a second energy cycle utilizes a second energy source operatively associated with a corresponding second heat sink, and a second inert agent to provide energy transfer therebetween and temperature control during operation of the second energy source. The first and second energy sources are not identical, the first and second heat sinks are not identical and the first and second inert agents are not identical. The first and second energy cycles are configured in combination to provide a power generation unit.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An oxygen fired power generation system comprising:
 a water recycle line fluidly communicating with a first combustor;
 a supply of fuel;
 a supply of oxygen;
 said first combustor adapted and configured to receive water from said water recycle line, fuel from said supply of fuel and oxygen from said supply of oxygen, said first combustor further adapted and configured to operate at a first combustor pressure;
 a first turbine adapted and configured to:
  receive a combustion products from said first combustor,
  generate power by expansion of said combustion products therethrough, and
  operate at a first turbine pressure;
 a carbon dioxide recycle line;
 a second combustor adapted and configured to receive a discharge gas from said first turbine, fuel from said supply of fuel, oxygen from said supply of oxygen, and carbon dioxide from said carbon dioxide recycle line, said second combustor further adapted and configured to operate at a second combustor pressure, said first combustor pressure being greater than that of said second combustor pressure; and
 a second turbine adapted and configured to:
  receive a drive gas from said second combustor,
  generate power by expansion of said drive gas therethough, and
  operate at a second turbine pressure lower than that of said first turbine pressure.

* * * * *